Feb. 21, 1928.  1,660,198

F. C. IELFIELD
CORN HUSKER
Filed Aug. 19, 1926  5 Sheets-Sheet 1

Feb. 21, 1928.

F. C. IELFIELD

CORN HUSKER

Filed Aug. 19, 1926

Fred C. Ielfield Inventor
by Pope & Powers
Attorneys.

Feb. 21, 1928. 1,660,198
F. C. IELFIELD
CORN HUSKER
Filed Aug. 19, 1926 5 Sheets-Sheet 3

Inventor
Fred C. Ielfield
by Popple & Powers
Attorneys

Patented Feb. 21, 1928.

1,660,198

UNITED STATES PATENT OFFICE.

FRED C. IELFIELD, OF SILVER CREEK, NEW YORK.

CORN HUSKER.

Application filed August 19, 1926. Serial No. 130,243.

This invention relates to a corn husking machine, and more particularly to that type of husking machine, in which the husk is removed from the ear of corn by successive stages while the corn is propelled through the machine.

One of the objects of this invention is to provide a husking machine of this character which will pick a single ear of corn from the feeding table upon which a number of ears have been placed, thereby rendering the feeding of the machine a relatively simple operation, and which will then effectively sever the butt from the ear, shred the husk and deliver the ear to the husking rolls from which it is ejected after the rolls have acted on it for a predetermined length of time.

Further objects are to provide a simple, compact and durable machine which is not likely to get out of order, and will operate to continuously and uniformly husk the corn without fouling any of the parts of the machine and thereby rendering them less efficient.

In the accompanying drawings.

Similar reference numerals indicate like parts in each of the several views.

In its general organization this invention comprises a curved operating table having depressed front and rear ends, husking rolls arranged at its rear end, an inclined feeding table arranged at the front end, and a rotary carrier mounted below the operating table and adapted to elevate a single ear of corn from the feeding table, and carry it past preparing devices to the summit of the operating table from which it rolls downwardly to the husking rolls.

The husking machine is supported by a frame which comprises two side plates 14, 15, between which the propelling and husking mechanisms are mounted and legs or standards 16 formed integrally with the side plates. At the front end of each of the side plates, forwardly projecting arms 17 are provided which preferably incline upwardly and terminate in horizontal end portions 18. A section 19 of sheet metal extends between these arms and forms a feeding table upon which the ears of corn are placed preparatory to being husked.

From the feeding table the ear of corn is carried upwardly over a curved operating table or drum. This operating table is composed of a wide section 20 arranged adjacent the side plate 14, and two narrow strips 21 which are arranged adjacent the side plate 15 and are spaced to form slots 22 through which the propelling mechanism travels. Each of these sections 20 and 21 are suitably secured at their front ends to the underside of the lower rear end of the feeding table 19, and at their rear ends are secured to the upper side of a transverse supporting plate 23 which is fastened at its ends to the frame plates 14 and 15.

Below the operating table or drum is arranged a transverse shaft 24 which is journaled in the side plates 14 and 15 and is driven by a main driving gear 25 mounted on this shaft outside of the frame. Secured to this shaft with the frame are two arms 26, 27, which are suitably counterbalanced, and at their outer ends carry a shaft 28 on which the ear propelling fingers 29 are mounted. These fingers are preferably three in number, and are adapted to pass upwardly through slots provided at the lower end of the feeding table, and propel the same upwardly along the operating table or drum and over its summit, after which the ear rolls down the rear side of the table or drum and the propelling fingers are retracted below the operating table. Each of these propelling fingers is preferably curved forwardly so as to embrace a portion of the ear and thereby ensure the proper positioning of the ear while it is being carried by the devices which sever the butt and shred the husk.

After the ear of corn has been propelled over the top of the operating table or drum, the fingers 29 are retracted below the table by a mechanism which preferably is constructed as follows:

Secured to the end of the shaft 28 which carries the fingers 29, is an arm 31 supporting a transverse pin 32 at its outer end, on which is mounted a roller 33. This roller engages the periphery of a cam plate 34 which is rigidly secured to the side plate 14 of the machine frame by bolts 35. This cam plate has a salient portion 36 on its rear side, and a receding portion 37 on its front side, the two portions being substantially equal in extent. To hold the cam arm 31 and roller 33 constantly in engagement with the cam, a spring 38 is provided which surrounds the shaft 28 and is anchored at one end in the arm 27 and at its opposite end in a collar 39 secured to the shaft 28. When the fingers are about to pass upwardly through the feeding table to pick up an ear of corn, the roller 33 is in engagement with the salient portion of the cam 34 and the ear propelling fingers 29 are in their projected positions. The fingers are held in their projected positions until they pass the summit of the operating table, at which time the roller engages the receding face of the cam, and the spring 38 causes a retrograde movement of the shaft 28 thereby swinging the fingers toward the shaft 24 and withdrawing them below the table. This retracted position is maintained until the propelling fingers are again in position to pick up an ear of corn from the operating table. It will be noted that the drum or operating table forms an abutment at its lower front end which properly positions a single ear of corn to be picked up by the propelling fingers and carried over the operating table, and that the main axis of the carrier is arranged in substantially the same horizontal plane or preferably a little higher than the lower end of the feeding table, thereby permitting the lowermost ear to be picked up without disturbing and deranging the other ears.

At the upper end of the operating table the butt is severed from the ear of corn by a knife 40. This knife is bolted to the frame plate 15 and has a lower forwardly and downwardly inclined sharpened edge 41 which is arranged in the path of the ear and operates to sever the butt. The ear is then carried on by the propelling fingers, and the severed butt falls into a hopper 42 which is formed integrally with the side plate 15 and directs the butts into a suitable waste receptacle. In order to properly position the corn lengthwise on the feeding table so that a proper amount of the butt is severed by the knife 40, a gage is provided which comprises a low abutment 43 arranged longitudinally on the upper side of the feeding table against which abutment the operator places the shoulder of the ears of corn to be husked. This gage is preferably adjustable transversely of the table to adapt it to different varieties of corn by providing slots 44 in the table through which the fastening bolts 45 for the gage extend.

Preparatory to removing the husk from the ear, the husk is loosened, torn or shredded so that the husking mechanism is able to obtain a firm grip on the leaves of the husk and tear them from the ear. These shredding means in the present construction are arranged at the summit of the operating table and act upon the upper and lower sides of the ear of corn at the same time that the butt is being severed.

The shredding device which acts on the lower side of the ear is constructed as follows:

On the inner side of the operating table at its lower front end are suitably secured two curved spring arms 46 which extend rearwardly along the underside of the table and are spaced therefrom. At a suitable point, each of these spring arms is provided with a shredding pin or finger 47 which is adapted to be projected upwardly through an aperture 48 in the operating table and into the path of the ear of corn being propelled over the same. Each of these fingers or pins is moved upwardly by a roller 49 which is mounted on the finger projecting shaft 28 and engages the underside of the spring arm while the ear is being propelled past the summit of the operating table, and forces it upwardly, thereby projecting the shredding finger 47 through the aperture 48 and into the path of the ear tearing the husk. When the rollers 49 pass beyond the end of the spring arms 46, the pin is retracted by the resilience of the arm, and the finger is thereby cleaned of any shreds of the husk which otherwise would accumulate around the finger and render it inoperative.

Figure 6:
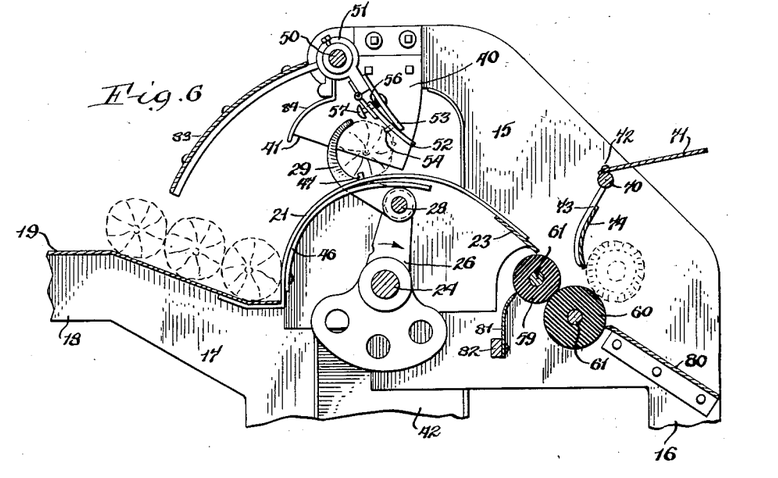
Figure 6 is a similar view showing the position of the parts while the butt of an ear is being severed and the husk shredded.
Figures 7, 8, 9:
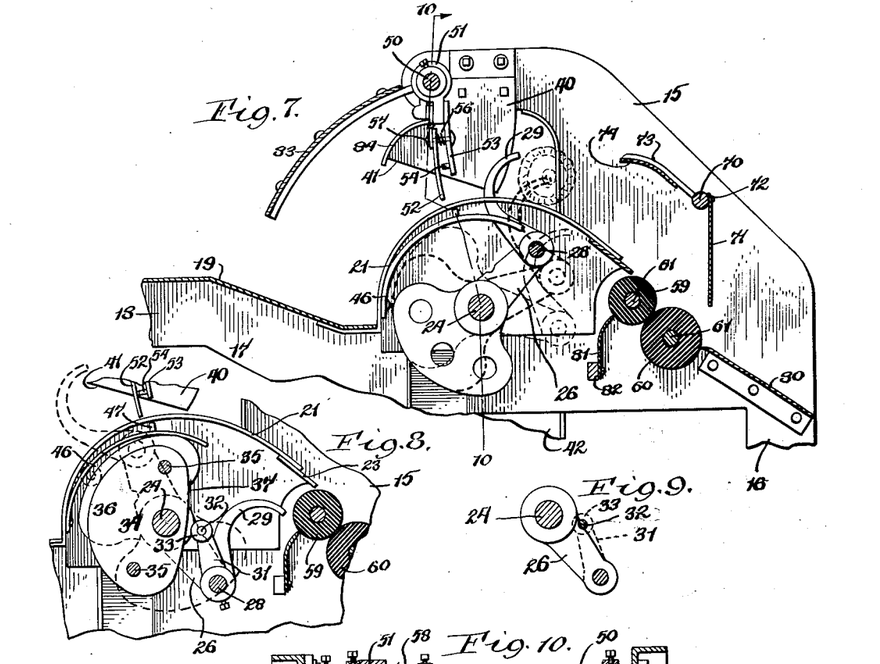
Figure 7 is a similar view showing the ear released from the propelling fingers, and the finger being withdrawn.
Figure 8 is a vertical section of the machine showing the stationary cam which controls the carrying fingers.
Figure 9 is a vertical fragmentary section on line 9—9, Fig. 10.
Figure 10:
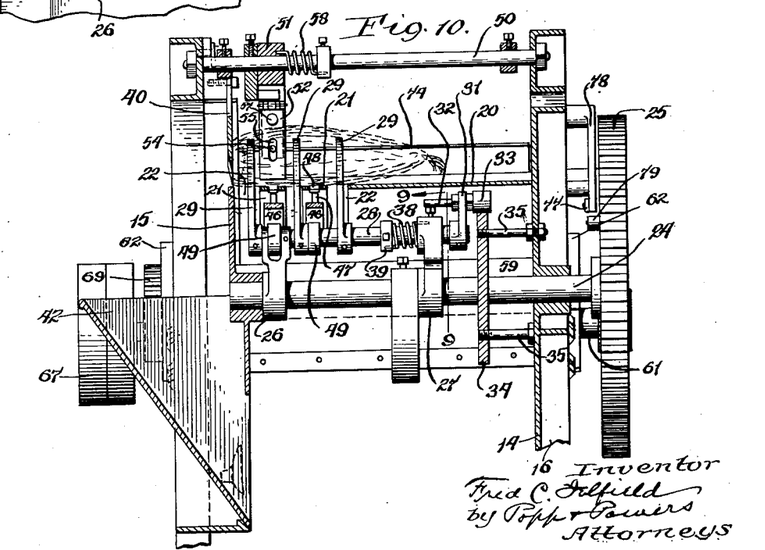
Figure 10 is a vertical transverse section taken on line 10—10, Fig. 7.

A similar self-cleaning shredding finger engages the upper side of the ear of corn. A transverse rod 50 extends across the frame above the husking mechanism. On this rod is mounted a collar 51 to which is pivotally secured a strip 52 which extends downwardly into the path of the ear of corn traveling over the operating table. This strip is backed by an arm 53 which carries a pin 54 adapted to be projected through an aperture 55 in the strip. The normal separation of these arms is effected by a helical spring 56 interposed between the same and held in place by a bolt 57. This shredding mechanism is normally held in a pendant position by a helical spring 58 anchored in a fixed collar. When an ear of corn passes the same, the pivotally mounted strip 52 is first deflected rearwardly, and the shredding pin 54 is projected through the aperture 55 into the husk. The continued movement of the ear operates to shred the husk and also to deflect the arm 53 and the collar 51 rearwardly against the resistance of the spring 58 as shown in Fig. 6. When the ear of corn clears the shredder, the springs 58 and 56 return the parts to their normal position, and the finger 54 is retracted from the aperture 55 by the forward movement of the plate 52 which removes any remnants of the husk from the finger and prevents it from being clogged or rendered inoperative.

After the butt has been severed and the husk shredded, the ear of corn rolls down the rear side of the husking table between two rubber husking rolls 59 and 60 which are arranged at the foot of the operating table and contact with each other so that when they are oppositely rotated the leaves of the husk and the silk are gripped by the rolls and carried down between them to a suitable waste receptacle or conveyer arranged below the rolls, thereby tearing the same from the ear which remains on the upper side of the two rolls until discharged by a mechanism hereinafter described. The axes of the two rolls are preferably arranged at an angle to each other, and the lower rear roll 60 is of larger diameter and supports the ear while it is being husked. Each of the rubber rolls is supported by a shaft 61 forming a core, and each shaft is journaled at its opposite ends in bearings 95 which are supported by plates 62 which are removably secured to the outer sides of the frame plates 14 and 15 and extend over relatively large openings in the frame plates through which each of the rolls may be readily inserted longitudinally into the machine without removing any other parts of the machine, and removed therefrom when necessary. The bearings are also preferably adjustable to different positions so that the rolls can be moved to different positions relatively to each other, this being preferably accomplished by supporting the bearings between inclined screws 63, threaded in bosses 64 in the plates 62 and mounting the plates 62 so as to be movable transversely of the screws 63 as by providing inclined slots 65 through which extend the bolts 66 which secure these plates to the frame.

Figure 1:
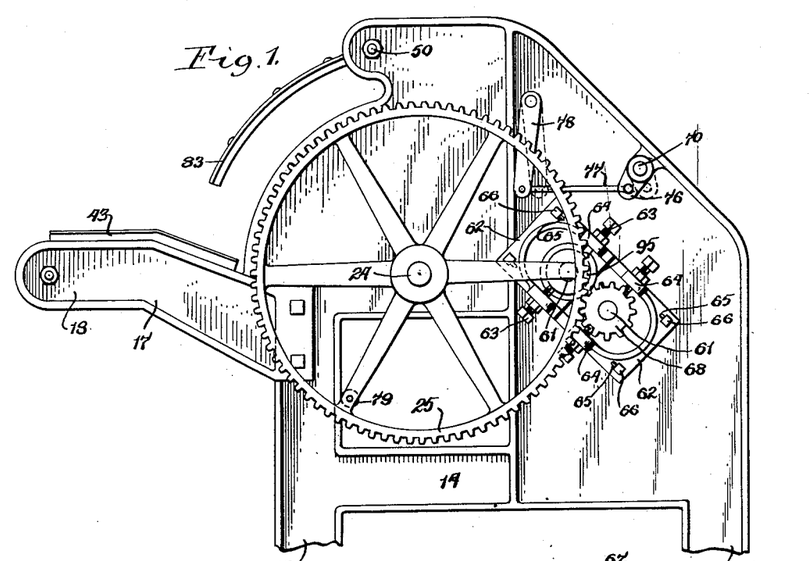
Figure 1 is a fragmentary side elevation of the husking machine.
Figure 2:
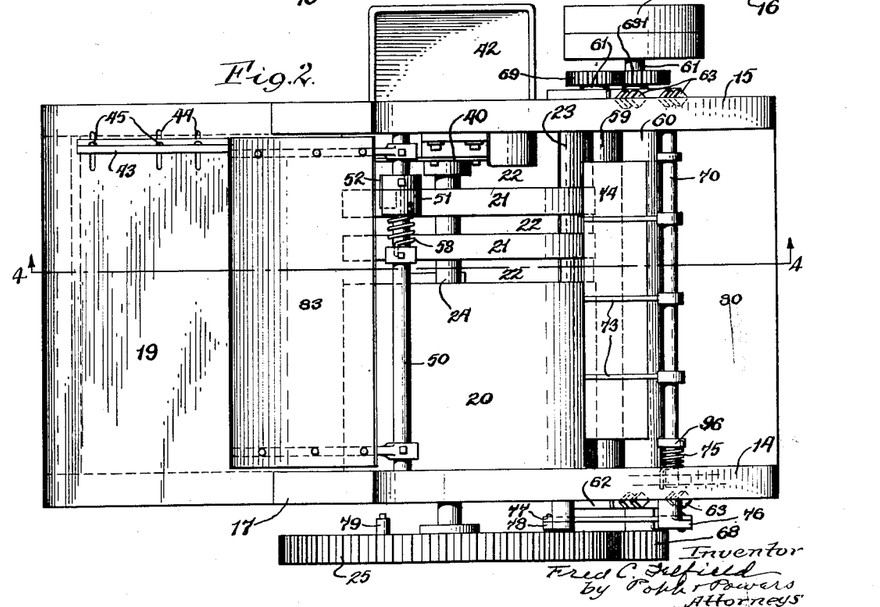
Figure 2 is a top plan view thereof.
Figure 3:
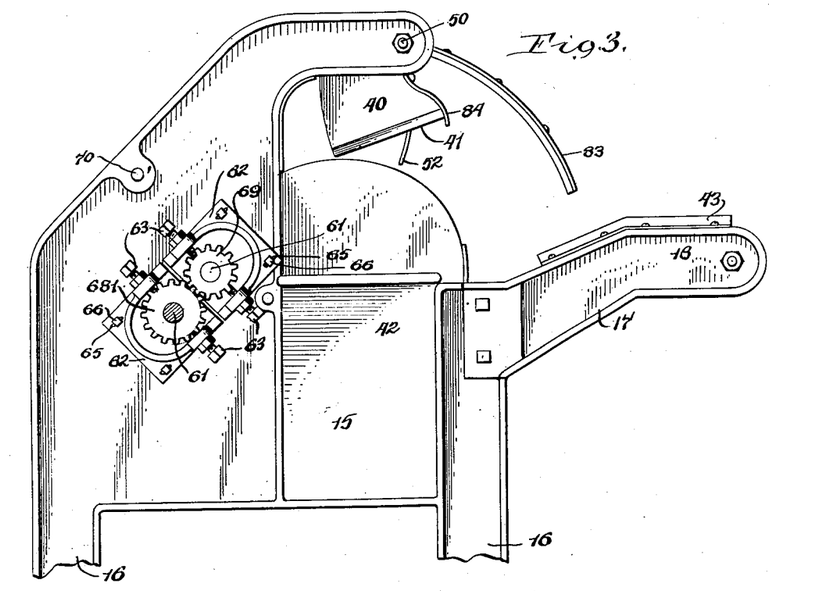
Figure 3 is a side elevation of the machine viewed from the side opposite to that shown in Fig. 1.
Figure 4:
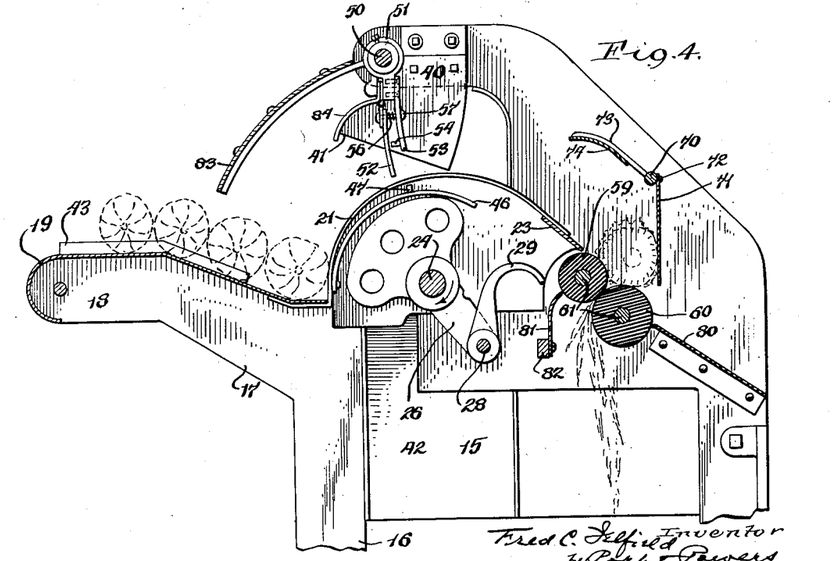
Figure 4 is a longitudinal vertical section taken on line 4—4, Fig. 2.

The rolls and carrier mechanism may be driven by any suitable interconnecting gearing. In the preferred form illustrated, as best shown in Figs. 1–3, a driving pulley 67 is mounted on the shaft 61 of the lower roll 60 adjacent the outer side of the frame plate 15, and at its opposite end a pinion 68 is mounted which meshes with and drives the main gear wheel 25. The roll 59 is driven from the lower roll by intermeshing pinions 68 and 69 which are mounted on the shafts 61 thereof between the pulley 67 and the frame, and are of suitable sizes to drive the rolls at the same peripheral speeds.

Figure 5:
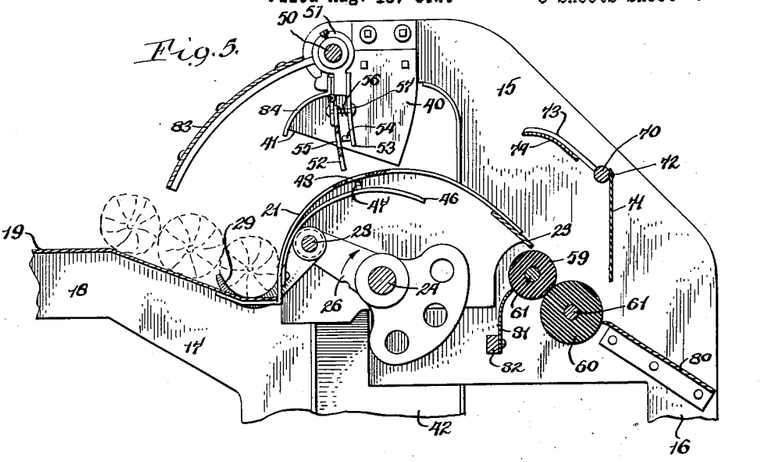
Figure 5 is a vertical section similar to Fig. 4 showing the mechanism about to remove an ear of corn from the feeding table.

Means are provided for retaining the ear between the husking rolls until completely husked and thereafter removing the ear before the next succeeding ear is engaged by the husking rolls, thereby permitting the rolls to operate on only one ear at a time and avoiding imperfect husking. These means are preferably constructed as follows:

Arranged above the husking rolls is a transverse shaft 70 which is suitably journaled at its opposite ends in the frame and carries a depending baffle plate 71 suitably fastened by screws 72, and a plurality of forwardly and upwardly projecting arms 73 which carry at their outer ends a transverse plate 74. This shaft is yieldingly held in the position shown in Fig. 5 in which the lower edge of the baffle plate is arranged adjacent the lower husking roll, by a helical spring 75 which surrounds the shaft and is anchored at one end in a collar 96 fixed to the shaft and at its other end to the frame. On this shaft 70 adjacent the outer side of the frame plate 14, an arm 76 is mounted which is connected by a forwardly extending horizontal link 77 to the lower end of a swinging lever 78 which is pivotally secured to the frame and is arranged between the frame and the main gear wheel 25. On one of the spokes of the main gear wheel 25 a roller 79 is mounted which roller engages the swinging lever 78 and moves this lever and the arm 76 rearwardly, thereby rocking the shaft 70. The rocking of the shaft 70 as shown in Fig. 6, raises the baffle plate 71, and swings the plate 74 downwardly sweeping the husked ear of corn from the husking rolls to an inclined plate 80 which directs the ear to a suitable conveyer or receptacle. The movement of the shaft 70 is preferably timed so as to give the maximum husking effect to the ear of corn between the husking rolls before the succeeding ear of corn passes over the summit of the operating table.

To prevent remnants of the husk from adhering to the rolls, the inclined plate or chute 80 scrapes the lower husking roll, and a scraper 81 mounted on a transverse bar 82 scrapes the upper husking roll.

The machine is also suitably guarded at all places where the operator is liable to be injured, the gears being covered by the usual guards (not shown) and a guard 83 in the form of a canopy being secured to the cross rod 50 and extending forwardly and downwardly therefrom over the feeding table. A suitable guard 84 is likewise provided for the knife 40.

Figures 11, 12, 13:
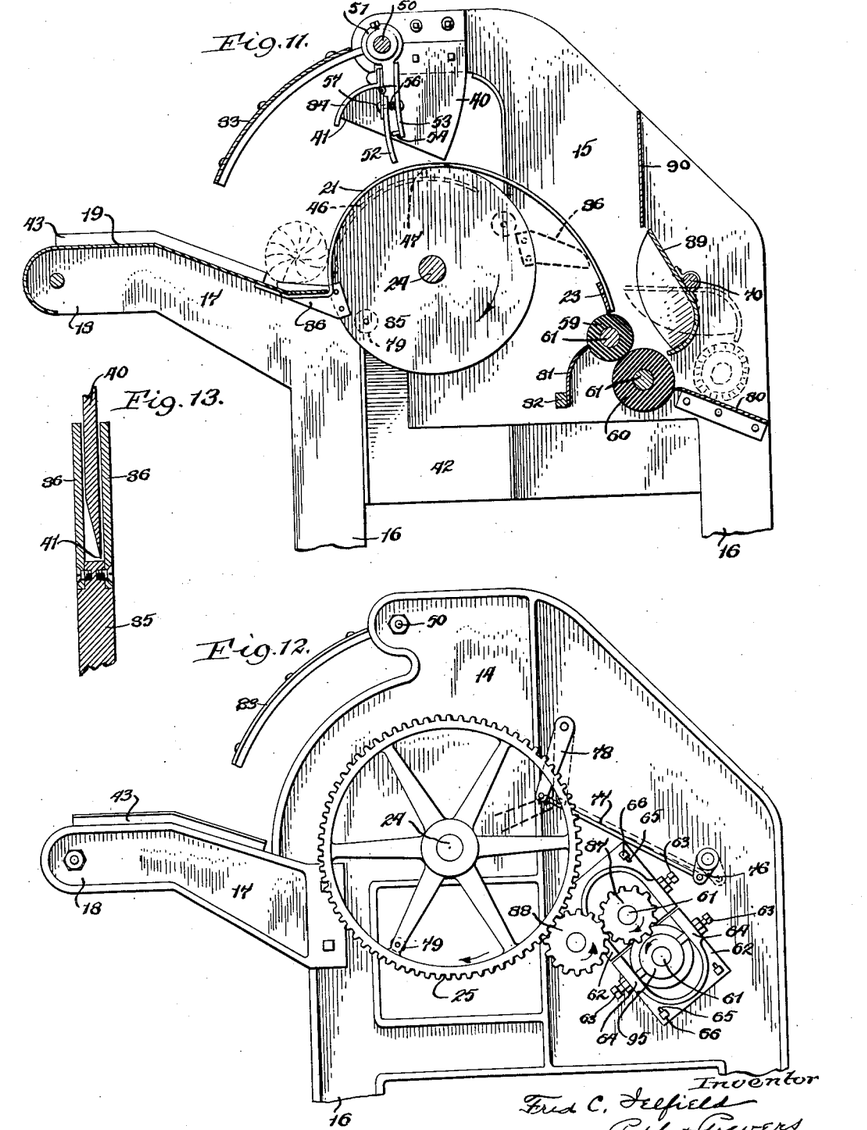
Figure 11 is a vertical longitudinal section showing a modification of my invention.
Figure 12 is a side view thereof.
Figure 13 is a vertical section through the butt severing knife in the modified construction.

In the modified form of husking machine shown in Figs. 11–13, instead of the cam actuated mechanism for projecting and retracting the fingers, a plurality of discs 85 are mounted on the main shaft 24, each of which carries a wing or finger 86 in the form of a flat piece of metal riveted to the side of the disc and adapted to be propelled through the slots 22 provided in the operating table and elevate an ear of corn from the feeding table to the summit of the operating table in the same manner as in the preferred construction. To provide for the retraction of the wings at the proper time, the operating table is extended rearwardly and arched to a greater degree than in the preferred construction. This necessitates mounting the husking rolls somewhat lower, and altering the driving mechanism by driving the main gear wheel 25 from a pinion 87 on the upper husking roll shaft through an intermediate pinion 88 mounted on the frame, the latter pinion being necessary to drive the main gear wheel in the proper direction. In this construction, one of the propelling discs 85 is arranged under the knife 40 and carries two wings 86 which are set into the opposite faces of the disc as shown in Fig. 13, and are adapted to closely straddle the knife as they pass the same. By this means the butt which is carried by these wings is cleanly severed and cannot hang to the ear and be carried onto the husking rolls.

In the modified construction the mechanism for releasing the ear from the husking rolls is formed of a single piece of metal 89 as shown in Fig. 11, which is suitably secured to the rock shaft 70 and is actuated in the same manner as in the preferred construction. The rear part of this plate is curved and forms a retaining baffle and the front end thereof extends upwardly and forwardly in the direction of the movement of the ear of corn and confines the ear in a transverse position between the husking rolls, and prevents up-ending and the consequent imperfect husking of the ear. A stationary baffle 90 is also preferably mounted on the frame above the retaining plate 89 to prevent the ears from escaping the husking rolls. In other respects the modified form follows the preferred form of my invention.

In both forms of my invention the machine is extremely simple in construction considering the function which it performs. The ears are operated upon individually and there is, therefore, no tendency for the ears to pile up and be imperfectly prepared. The machines are also positive in action, will reliably and continuously sever the butts and husk the ears and will withstand severe and continuous usage without getting out of order.

I claim as my invention:

1. In a corn husking machine, a stationary inclined feeding table, propelling means passing upwardly through slots provided in said table at the lower end thereof and adapted to elevate an ear of corn therefrom, and means for subsequently stripping the husk from said ear.

2. In a corn husking machine, a stationary inclined table, an abutment arranged at the lower end of said table, propelling means passing upwardly through said abutment and table and adapted to elevate an ear of corn from said table, and means for subsequently stripping the husk from said ear.

3. In a corn husking machine, a stationary inclined feeding table, an abutment arranged at the lower end of said feeding table, a rotary carrier including a finger adapted to pass through said table and abutment and elevate an ear of corn from said table, and means for subsequently stripping the husk from said ear.

4. In a corn husking machine, a stationary inclined feeding table, an abutment arranged at the lower end of said feeding table, a rotary carrier including a finger adapted to pass through said table and abutment and elevate an ear of corn from said table, and means for subsequently stripping the husk from said ear, the axis of said rotary carrier being substantially in the same horizontal plane as the lower end of said table.

5. In a corn husking machine, a stationary feeding table, a stationary curved operating table extending upwardly and rearwardly from said feeding table, means for propelling the ear of corn along said operating table, and a husking mechanism arranged at the rear end of said operating table.

6. In a corn husking machine, a stationary feeding table, a stationary curved operating table extending upwardly and rearwardly from said feeding table and having its rear end inclining downwardly, a device for preparing the ear for husking arranged at the summit of said table, means for propelling an ear of corn from said feeding table over the summit of said operating table, and a husking mechanism arranged at the rear end of said operating table.

7. In a husking machine, a stationary feeding table, a stationary curved operating table extending upwardly and rearwardly from said feeding table and the rear end thereof inclining downwardly, a husking mechanism arranged at the rear end of said operating table, and means for propelling the ear of corn from said feeding table and over the summit of said operating table comprising a transverse shaft arranged below said operating table and a rotary carrier mounted on said shaft, and including a finger adapted to project through said feeding and operating tables.

8. In a husking machine, a feeding table, a curved operating table extending upwardly and rearwardly from said feeding table and the rear end thereof inclining downwardly, a husking mechanism arranged at the rear end of said operating table, and means for propelling the ear of corn from said feeding table and over the summit of said operating table comprising a transverse shaft arranged below said operating table and a rotary carrier mounted on said shaft, and including a finger adapted to project through said feeding and operating tables, and means for retracting said finger below said operating table after it has passed the summit of the same.

9. In a corn husking machine, a feeding table, a transverse shaft arranged in rear of said table, a curved operating table extending upwardly and rearwardly from said feeding table, the front portion of said operating table being curved concentric with said shaft, and the rear portion thereof extending downwardly and away from said shaft, said feeding and operating tables having a longitudinal slot, a rotary carrier mounted on said shaft and including a finger adapted to project through said slot and propel an ear of corn from said feeding table to the summit of said operating table, means arranged at the summit of said operating table for preparing the ear for husking and a husking mechanism arranged at the lower rear end of said operating table.

10. In a corn husking machine, an operating table having a longitudinal slot, a carrier arranged below said table and including a finger projecting upwardly through said table and adapted to propel an ear of corn along said table, a husking mechanism arranged adjacent said table and in the path of the ear of corn, and cam means for retracting said finger below said table.

11. In a corn husking machine, a curved operating table having depressed front and rear ends, means for feeding an ear of corn to said operating table, a shaft arranged below said table, a rotary member mounted on said shaft, a finger pivotally mounted on said member and adapted to project through said slot and propel an ear of corn along said table, a husking mechanism mounted adjacent said table and in the path of the ear of corn and cam means for retracting said finger below said table.

12. In a corn husking machine, a curved operating table having depressed front and rear ends, means for feeding an ear of corn to said operating table, a shaft arranged below said table, a rotary member mounted on said shaft, a finger pivotally mounted on said member and adapted to project through said slot and propel an ear of corn along said table, a husking mechanism mounted adjacent said table and in the path of the ear of corn, and cam means for swinging said finger oppositely to the rotation of said member and retracting said finger below said table.

13. In a corn husking machine, a frame, a curved operating table having depressed front and rear ends mounted on said frame, said table being provided with a slot, means for feeding an ear of corn to said table, a transverse shaft mounted on said frame, a rotary member mounted on said shaft, and carrying a rock shaft at its outer end, a finger mounted on said rock shaft and adapted to project through said slot and propel an ear of corn along said table, an arm mounted on said rock shaft, a cam mounted on said frame and engaging said arm, said cam being shaped to hold said finger in its projected position during its initial movement through said slot, and to thereafter retract said finger below said table, and a husking mechanism mounted adjacent said table in the path of the ear of corn.

14. In a corn husking machine, means for propelling an ear of corn, husking means mounted adjacent said propelling means, and fixed shredding fingers yieldingly mounted on stationary parts of the machine and simultaneously engaging the opposite sides of the ear of corn.

15. In a corn husking machine, means for propelling an ear of corn the axis of said ear of corn being at right angles to its direction of movement, a butt severing device arranged in the path of said ear, and husk shredding means engaging the upper side of said ear while its butt is being severed and tending to hold it against displacement.

16. In a corn husking machine, an apertured member, means for propelling an ear of corn past said apertured member, a shredding finger, means for projecting said shredding finger through said aperture into the path of said ear while said ear is passing said aperture, means for subsequently retracting said shredding finger, and a husking mechanism arranged in the path of said ear of corn.

17. In a corn husking machine, means for propelling an ear of corn, a husking mechanism arranged in the path of said ear of corn, and a device for shredding the husk of said ear comprising an apertured arm yieldingly held in the path of said ear and adapted to be deflected thereby and a shredding finger mounted adjacent said arm and adapted to be projected through said aperture and into said husk by the deflection of said arm.

18. In a corn husking machine, means for propelling an ear of corn, a husking mechanism arranged in the path of said ear of corn, and a device for shredding the husk of said ear comprising an apertured arm yieldingly mounted in the path of said ear and adapted to be deflected thereby, an arm yieldingly mounted in rear of said arm and a shredding finger mounted on said last mentioned arm and adapted to be projected through said aperture and into the husk of said ear when said first mentioned arm is deflected by said ear.

19. In a corn husking machine, means for propelling an ear of corn, a husking mechanism arranged in the path of said ear of corn, and a device for shredding the husk of said ear comprising a member yieldingly mounted above said propelling means, an apertured arm pivotally mounted on said member and adapted to be deflected rearwardly by said ear of corn, an arm mounted on said member in rear of said first named arm, a shredding finger mounted on said last named arm and adapted to be projected forwardly through said aperture and into the husk of said ear when said first named arm is deflected thereby, and means for retracting said finger comprising a spring interposed between said arms.

20. In a corn husking machine, an operating table having an aperture, means for propelling an ear of corn along said operating table, a husking mechanism arranged in the path of said ear of corn, and means for shredding the husk of said ear comprising a shredding finger mounted below said table, means actuated by said propelling means for projecting said finger through said aperture and into the husk of the ear passing over the same, and means for retracting said finger.

21. In a corn husking machine, a curved operating table having depressed front and rear ends, longitudinal slots, and an aperture at its summit, a rotary carrier arranged below said table and including fingers adapted to pass through said slots and propel the ear along said table, means for feeding the ear to said propelling means, husking means arranged adjacent said table, and means for shredding the husk comprising a spring arm mounted on the underside of said table, a finger mounted on said spring arm below said aperture and means arranged on said rotary carrier for projecting said shredding finger upwardly through said aperture and into the husk of said ear of corn.

22. In a corn husking machine, a stationary slotted operating table, a carrier arranged below said table and including a finger adapted to project through said table and propel an ear of corn, means for feeding an ear of corn to said propelling finger, a knife mounted adjacent said table and adapted to sever the butt from said ear, and husking means mounted adjacent said table, said finger being curved forwardly and being adapted to embrace a portion of the ear of corn.

23. In a corn husking machine, an inclined feeding table, a curved operating table extending upwardly and rearwardly from said feeding table, said tables being slotted, a rotary carrier mounted below said table and including a finger adapted to be projected through said slot and to propel an ear of corn from said feeding table along said operating table, and husking means mounted adjacent said operating table, said carrying finger being curved and embracing a portion of said ear.

24. In a corn husking machine, an operating table, means for propelling an ear of corn along said table including a plurality of fingers projecting upwardly from said table and adapted to engage the rear side of an ear of corn, a knife mounted adjacent said table and being adapted to sever the butt from said ear of corn, at least one of said fingers having portions adapted to pass along opposite sides of said knife in close proximity thereto, and husking means adapted to subsequently remove the husk.

25. In a corn husking machine, means for removing the husks from an ear of corn, means for feeding an ear of corn to said husking means, a swinging baffle holding the ear of corn in engagement with said husking means, and means for actuating said baffle to release said ear.

26. In a corn husking machine, a pair of husking rolls having their axes arranged in different horizontal planes, means for feeding an ear of corn between said rolls, means for driving said rolls, means for holding the ear of corn between said rolls, and means controlled by the movement of said driving means for releasing said holding means at a predetermined time.

27. In a corn husking machine, means for removing the husks from an ear of corn, means for feeding an ear of corn to said husking means, a swinging gate holding the ear of corn in engagement with said husking means, a swinging plate for ejecting the husked ear from said husking means, and means for simultaneously releasing said holding gate and actuating said ejecting plate.

28. In a corn husking machine, a pair of husking rolls having their axes arranged in different horizontal planes, means for feeding the ear of corn between said rolls, a gate pivotally mounted to swing upwardly and adapted to prevent the ear from passing said rolls, and means for raising said gate and releasing the husked ear of corn at a predetermined time.

29. In a corn husking machine, a pair of husking rolls having their axes arranged in different horizontal planes, a main gear wheel driving said rolls, means for feeding an ear of corn between said rolls, a shaft pivotally mounted above said rolls, a gate secured to said shaft and adapted to prevent the ear from passing the rolls, and means for raising said gate and releasing the husked ear comprising an arm mounted on said shaft, a tappet member mounted on said driving gear wheel, and means for swinging said arm through motion derived from said tappet member.

30. In a corn husking machine, a pair of husking rolls, means for feeding the ear of corn between said rolls, an ejecting plate pivotally mounted above said rolls to swing downwardly and sweep the husked ear from said rolls, and means for lowering said plate at a predetermined time.

31. In a corn husking machine, a pair of husking rolls, a main gear wheel driving said rolls, means for feeding an ear of corn between said rolls, a shaft pivotally mounted above said rolls, an ejecting plate secured to said shaft, and means for swinging said plate downwardly and sweeping the husked ears from said rolls comprising an arm mounted on said shaft, a tappet member mounted on said driving gear wheel and means for swinging said arm through motion derived from said tappet member.

32. In a corn husking machine, a pair of parallel husking rolls the axes of which are arranged in different horizontal planes, means for feeding an ear of corn to said rolls comprising an inclined table terminating above the upper husking roll, a shaft mounted above said rolls and parallel therewith, a plate secured to said shaft and extending upwardly in substantially the direction of movement of the ear down said table, a plate extending downwardly from said shaft and adapted to hold said ear on said rolls, and means for rocking said shaft and releasing said ear after the same has been husked.

33. In a corn husking machine, a frame, a feeding table, a slotted operating table having depressed front and rear ends, a shaft arranged below said table, a rotary carrier mounted on said shaft and including fingers adapted to project through said slots and propel the ear of corn along said operating table, a main gear wheel driving said shaft, means for preparing the ears for husking arranged at the summit of said operating table, husking rolls arranged at the depressed rear end of said table and operated through motion derived from said main gear wheel, a device for holding the ear of corn on said husking rolls, and means for releasing said holding device through motion derived from said main gear wheel.

34. In a corn husking machine, a curved operating table having longitudinal slots and depressed front and rear ends, a feeding table extending forwardly from the lower front end of said operating table, a shaft mounted below said operating table, a main gear wheel driving said shaft, a rotary carrier mounted on said shaft and including fingers adapted to project through said slots and propel the ear of corn to the summit of said operating table, and husking rolls mounted at the depressed rear end of said operating table and operatively connected with said main gear wheel.

In testimony whereof I hereby affix my signature.

FRED C. IELFIELD.